United States Patent
Jalali et al.

(10) Patent No.: US 8,644,170 B2
(45) Date of Patent: Feb. 4, 2014

(54) RATE SELECTION FOR AN OFDM SYSTEM

(75) Inventors: Ahmad Jalali, San Diego, CA (US); Ivan Jesus Fernandez Corbaton, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1028 days.

(21) Appl. No.: 11/297,853

(22) Filed: Dec. 8, 2005

(65) Prior Publication Data

US 2006/0087972 A1  Apr. 27, 2006

Related U.S. Application Data

(63) Continuation of application No. 09/991,039, filed on Nov. 21, 2001, now Pat. No. 7,012,883.

(51) Int. Cl.
*G01R 31/08* (2006.01)
*H04J 11/00* (2006.01)

(52) U.S. Cl.
USPC ........... 370/252; 370/208; 370/343; 370/465; 370/470; 375/219; 375/343; 375/285

(58) Field of Classification Search
USPC ......... 370/252, 208, 203, 210, 343, 465, 470, 370/471, 400, 278; 375/219, 257, 343, 233, 375/86, 202, 144, 267, 285, 148, 261; 341/59
See application file for complete search history.

(56) References Cited

U.S. PATENT DOCUMENTS

| 4,355,404 | A | * | 10/1982 | Uzunoglu | ...................... 375/332 |
| 5,454,009 | A | * | 9/1995 | Fruit et al. | .................... 375/130 |
| 5,726,978 | A | | 3/1998 | Frodigh et al. | |
| 5,828,660 | A | | 10/1998 | Baum et al. | |

(Continued)

FOREIGN PATENT DOCUMENTS

| EP | 0703685 A2 | 3/1996 |
| EP | 0874494 A3 | 5/2000 |

(Continued)

OTHER PUBLICATIONS

Chen Q. et al. Multicarrier CDMA with Adaptive Frequency. Hopping for Mobile Radio Systems IEEE Journal on Selected Areas in Communications, US. IEEE Inc. New York, vol. 14 No. 9, Dec. 1, 1996, pp. 1852-1858.

(Continued)

*Primary Examiner* — Andrew Chriss
*Assistant Examiner* — Jamal Javaid
(74) *Attorney, Agent, or Firm* — Howard Seo

(57) ABSTRACT

Techniques to determine the rate for a data transmission in an OFDM system. The maximum data rate that may be reliably transmitted over a given multipath (non-flat) channel by the OFDM system is determined based on a metric for an equivalent (flat) channel. For the given multipath channel and a particular rate (which may be indicative of a particular data rate, modulation scheme, and coding rate), the metric is initially derived from an equivalent data rate and the particular modulation scheme. A threshold SNR needed to reliably transmit the particular data rate using the particular modulation scheme and coding rate is then determined. The particular rate is deemed as being supported by the multipath channel if the metric is greater than or equal to the threshold SNR. Incremental transmission is used to account for errors in the determined data rate.

20 Claims, 6 Drawing Sheets

(56) References Cited

U.S. PATENT DOCUMENTS

| | | | |
|---|---|---|---|
| 5,914,933 | A | 6/1999 | Cimini et al. |
| 6,167,031 | A | 12/2000 | Olofsson et al. |
| 6,175,550 | B1 | 1/2001 | Van Nee |
| 6,351,499 | B1* | 2/2002 | Paulraj et al. ............ 375/267 |
| 6,438,723 | B1 | 8/2002 | Kalliojarvi |
| 6,480,497 | B1* | 11/2002 | Flammer et al. ............ 370/400 |
| 6,538,585 | B2 | 3/2003 | Liu |
| 6,816,478 | B1 | 11/2004 | Laroia et al. |
| 6,829,293 | B2 | 12/2004 | Jones et al. |
| 7,012,883 | B2 | 3/2006 | Jalali et al. |
| 7,020,073 | B2 | 3/2006 | Kadous et al. |
| 7,386,044 | B2* | 6/2008 | Yousef ............ 375/233 |
| 2001/0050964 | A1* | 12/2001 | Foschini et al. ............ 375/267 |
| 2002/0063640 | A1* | 5/2002 | Liu ............ 341/59 |
| 2002/0154705 | A1 | 10/2002 | Walton et al. |
| 2002/0191703 | A1 | 12/2002 | Ling et al. |
| 2003/0003880 | A1 | 1/2003 | Ling et al. |
| 2003/0016645 | A1* | 1/2003 | Siala et al. ............ 370/342 |
| 2003/0035491 | A1 | 2/2003 | Walton et al. |
| 2003/0043928 | A1 | 3/2003 | Ling et al. |
| 2003/0076878 | A1* | 4/2003 | Jones et al. ............ 375/219 |
| 2003/0125040 | A1 | 7/2003 | Walton et al. |

FOREIGN PATENT DOCUMENTS

| | | |
|---|---|---|
| EP | 0874494 A2 | 8/2007 |
| JP | 1056420 A | 3/1989 |
| JP | 2000244461 A | 9/2000 |
| JP | 2000514276 A | 10/2000 |
| JP | 2001268058 A | 9/2001 |
| WO | 9848517 A1 | 10/1998 |
| WO | 9965155 | 6/1999 |
| WO | 0145300 | 6/2001 |
| WO | 0148969 A2 | 7/2001 |
| WO | WO0154339 A1 | 7/2001 |
| WO | 99513985 | 12/2002 |

OTHER PUBLICATIONS

Okhawa M. et al: Orthogonal MultiCarrier Frequency Hopping-Code Division Multiple Access Scheme for Frequency-Selective Fading Electronics and Communications in Japan, Part 1—Communications Scripta Technica. New York, US, vol. 76, No. 8, Aug. 1, 1996, pp. 86-98.

Van De Seek Jan-Jeep et al: A Time and Frequeoy Sychronization Scheme for Multiuser OFDM IEEE Journal on Selected Areas in Communications, IEEE Inc New York, US, vol. 17, No. 11. Nov. 1999, pp. 1900-1913.

J.G. Proakis, Digital Communications 3rd Edition, 1995, McGraw Hill, Sections 10-2-2 and 10-3-2.

John A. C.Bingtiarn, "Multioarrier Modulation for Data Transmission: An Idea those Time Has Come," IEEE Communication Magazine. May 1990 (pp. 5-14).

International Search Report—PCT/US02/037409, International Search Authority—European Patent Office, Apr. 6, 2003.

International Search Report—PCT/US02/037335, International Search Authority—European Patent Office, Mar. 6, 2003.

Falahati S., et.al, "Hybrid Type-II ARQ Schemes with Adaptive Modulation Systems for Wireless Channels", Vehicular Technology Conference, 1999. VTC 1999—Fall.,1999,vol. 5,pp. 2691-2695.

Fumio Takahata et al., "On OFDM/TDD Transmission Scheme With Subcarrier Adaptive Modulation", Collection of Lectures in General Meeting of the Institute of Electronics, Information and Communication Engineers 2001, Communication 1, Japan, Mar. 7, 2000, p. 498, B-5-100.

Hideo Kobayashi et al., "Grouping Adaptive Modulation Method for Burst Mode OFDM Transmission System", Report of the Institute of Electronics, Information and Communication Engineers, Japan, Aug. 31, 2001, vol. 101, No. 280, pp. 51-57, RCS2001-109.

Norihiko Morinaga et al., "Variable Transmission Rate Adaptive Modulation System With Punctured Convolutional Code for Land Mobile Communications", Report of the Institute of Electronics, Information and Communication Engineers, Japan, November 27, 1995, vol. 95, No. 390, pp. 75-80, RCS95-110.

Norihiko Morinaga et al., "A Study on Subcarrier Adaptive Modulation System Using Multilevel Transmission Power Control for OFDM/FDD System", Collection of Lectures in General Meeting of the Institute of Electronics, Information and Communication Engineers 2000, Communication 1, Japan, Mar. 7, 2000, p. 400, B-5-15.

Norihiko Morinaga et al., "Performance of a Multilevel Transmit Power Control Scheme for the OFDM Subcarrier Adaptive Modulation System", Report of the Institute of Electronics, Information and Communication Engineers, Japan, Jul. 11, 2000, vol. 100, No. 192, pp. 63-68, RCS2000-60.

Ryuji Kohno et al., "A Hybrid ARQ Scheme Using Multiple Punctured Convolutional Codes With Different Punctured Patterns", Report of the Institute of Electronics, Information and Communication Engineers, Japan, Jul. 25, 1997, vol. 97, No. 208, pp. 43-47, IT97-31.

Banerjee A., et al., "Bandwidth Efficient Hybrid ARQ Schemes Using Turbo Codes", Information Theory, 2000. Proceedings. IEEE, Jun. 30, 2000,p. 188.

Miki N., et al., "Performance of Hybrid ARQ Using Turbo Code in W-CDMA High Speed Downlink Packet Access," Technical Report of the Institute of Electronics, Information and Communication Engineers, Apr. 12, 2001, vol. 101, No. 12, pp. 33-40, RCS2001-5.

* cited by examiner

RATE SELECTION FOR AN OFDM SYSTEM

CLAIM OF PRIORITY UNDER 35 U.S.C. §120

The present Application for Patent is a Continuation in Part/Continuation and claims priority to patent application Ser. No. 09/991,039 entitled "Rate Selection For An OFDM System" filed Nov. 21, 2001, now U.S. Pat. No. 7,012,883 now allowed, and assigned to the assignee hereof and hereby expressly incorporated by reference herein.

BACKGROUND

1. Field

The present invention relates generally to data communication, and more specifically to techniques for selecting rate for a wireless (e.g., OFDM) communication system.

2. Background

Wireless communication systems are widely deployed to provide various types of communication such as voice, data, and so on. These systems may implement orthogonal frequency division multiplex (OFDM) modulation, which may be capable of providing high performance for some channel environments. In an OFDM system, the system bandwidth is effectively partitioned into a number of ($N_F$) frequency subchannels (which may be referred to as sub-bands or frequency bins). Each frequency subchannel is associated with a respective subcarrier (or frequency tone) upon which data may be modulated. Typically, the data to be transmitted (i.e., the information bits) is encoded with a particular coding scheme to generate coded bits, and the coded bits may further be grouped into multi-bit symbols that are then mapped to modulation symbols based on a particular modulation scheme (e.g., M-PSK or M-QAM). At each time interval that may be dependent on the bandwidth of each frequency subchannel, a modulation symbol may be transmitted on each of the $N_F$ frequency subchannels.

The frequency subchannels of an OFDM system may experience different channel conditions (e.g., different fading and multipath effects) and may achieve different signal-to-noise-and-interference ratios (SNRs). Each transmitted modulation symbol is affected by the frequency response of the communication channel at the particular frequency subchannel via which the symbol was transmitted. Depending on the multipath profile of the communication channel, the frequency response may vary widely throughout the system bandwidth. Thus, the modulation symbols that collectively form a particular data packet may be individually received with a wide range of SNRs via the $N_F$ frequency subchannels, and the SNR would then vary correspondingly across the entire packet.

For a multipath channel having a frequency response that is not flat or constant, the number of information bits per modulation symbol (i.e., the data rate or information rate) that may be reliably transmitted on each frequency subchannel may be different from subchannel to subchannel. Moreover, the channel conditions typically vary over time. As a result, the supported data rates for the frequency subchannels also vary over time.

Since the channel conditions experienced by a given receiver are typically not known a priori, it is impractical to transmit data at the same transmit power and/or data rate to all receivers. Fixing these transmission parameters would likely result in a waste of transmit power, the use of sub-optimal data rates for some receivers, and unreliable communication for some other receivers, all of which leads to an undesirable decrease in system capacity. The different transmission capabilities of the communication channels for different receivers plus the time-variant and multipath nature of these channels make it challenging to effectively code and modulate data for transmission in an OFDM system.

There is therefore a need in the art for techniques to select the proper rate for data transmission in a wireless (e.g., OFDM) communication system having the channel characteristics described above.

SUMMARY

Aspects of the invention provide techniques to determine and select the rate for a data transmission in a wireless (e.g., OFDM) communication system. These techniques may be used to provide improved system performance for an OFDM system operating with either a multipath (non-flat) channel or a flat channel.

In an aspect, the maximum data rate that may be reliably transmitted over a given multipath channel by the OFDM system is determined based on a metric for an equivalent frequency flat channel (e.g., a channel having a flat frequency response). For the given multipath channel, which is defined by a particular frequency response and a particular noise variance, the OFDM system may be capable of achieving a particular equivalent data rate $D_{equiv}$ using a particular modulation scheme $M(r)$. The equivalent data rate, $D_{equiv}$, may be estimated based on a particular channel capacity function (e.g., a constrained channel capacity function or some other function). The metric, which is an estimate of the SNR required by the equivalent frequency flat channel to reliably transmit at the equivalent data rate $D_{equiv}$ using the modulation scheme $M(r)$, is then determined for $D_{equiv}$ using $M(r)$ and further based on a particular function $g(D_{equiv}, M(r))$. A threshold SNR needed for the equivalent channel to reliably transmit a particular data rate $D(r)$ using the modulation scheme $M(r)$ and coding rate $C(r)$ is then determined. The data rate $D(r)$ is then deemed as being supported by the multipath channel if the metric is greater than or equal to the threshold SNR.

In another aspect, an incremental transmission (IT) scheme is provided and may be advantageously used in conjunction with the rate selection of the first aspect to reduce the amount of back-off and to improve system throughput. The IT scheme transmits a given packet of data using one or more discrete transmissions, one transmission at a time and up to a particular limit. The first transmission for the packet includes sufficient amount of data such that the packet can be recovered error-free at the receiver based on the expected channel conditions. However, if the first transmission is excessively degraded by the communication channel such that error-free recovery of the packet is not achieved, then an incremental transmission of an additional amount of data for the packet is performed. The receiver then attempts to recover the packet based on the additional data in the incremental transmission and all data previously received for the packet. The incremental transmission by the transmitter and the decoding by the receiver may be attempted for one or more times, until the packet is recovered error-free or the maximum number of incremental transmissions is reached.

Various aspects and embodiments of the invention are described in further detail below. The invention further provides methods, receiver units, transmitter units, receiver systems, transmitter systems, systems, and other apparatuses and elements that implement various aspects, embodiments, and features of the invention, as described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

The techniques described herein for determining and selecting the rate for a data transmission may be used for various wireless communication systems comprising one or more independent transmission channels, e.g., multiple-input multiple-output (MIMO) systems. For clarity, various aspects and embodiments of the invention are described specifically for an orthogonal frequency division multiplex (OFDM) system, where the independent transmission channels are the frequency subchannels or bins formed by dividing the total system bandwidth.

Figure 1A:
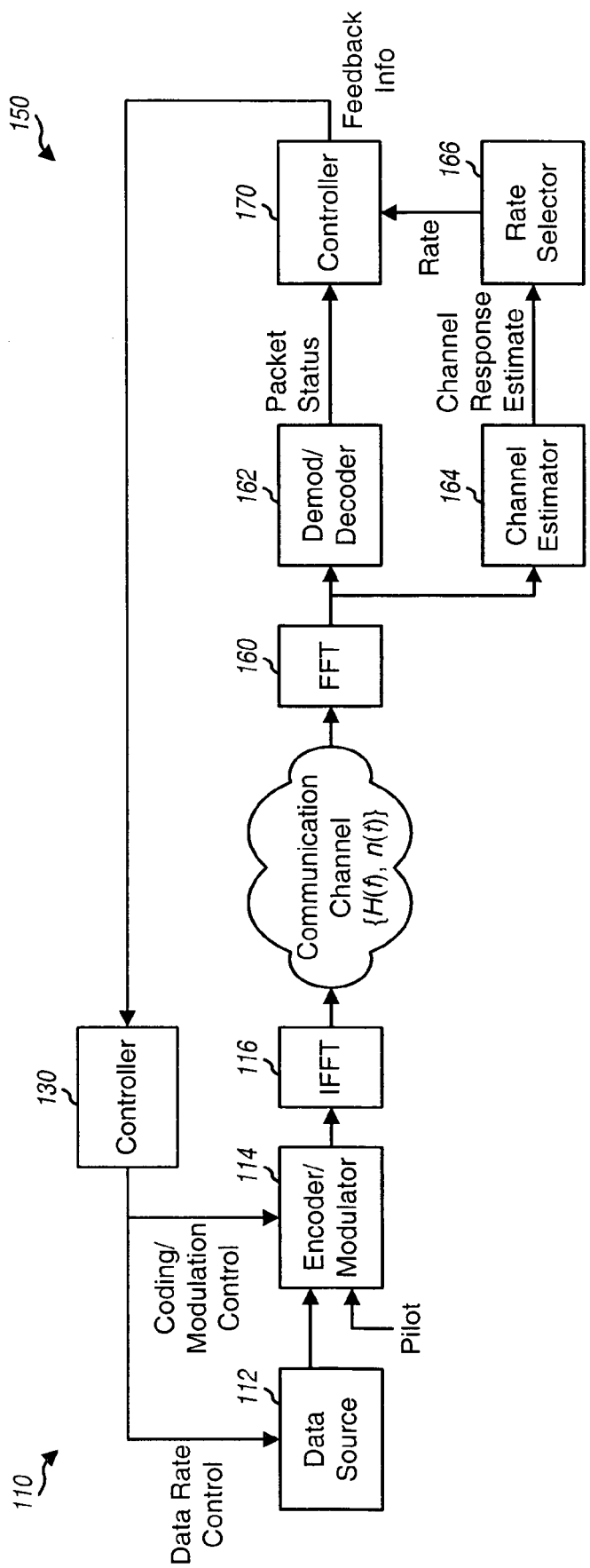
FIG. 1A is a diagram of a simplified model of an OFDM communication system.

FIG. 1A is a diagram of a simplified model of the OFDM system. At a transmitter 110, traffic data is provided at a particular data rate from a data source 112 to an encoder/modulator 114, which codes the data in accordance with one or more coding schemes and further modulates the coded data in accordance with one or more modulation schemes. The modulation may be achieved by grouping sets of coded bits to form multi-bit symbols and mapping each multi-bit symbol to a point in a signal constellation corresponding to the particular modulation scheme (e.g., QPSK, M-PSK, or M-QAM) selected for each frequency subchannel used to transmit the symbol. Each mapped signal point corresponds to a modulation symbol.

In an embodiment, the data rate is determined by a data rate control, the coding scheme(s) are determined by a coding control, and the modulation scheme(s) are determined by a modulation control, all of which are provided by a controller 130 based on feedback information received from a receiver 150.

A pilot may also be transmitted to the receiver to assist it perform a number of functions such as channel estimation, acquisition, frequency and timing synchronization, coherent data demodulation, and so on. In this case, pilot data is provided to encoder/modulator 114, which then multiplexes and processes the pilot data with the traffic data.

For OFDM, the modulated data (i.e., the modulation symbols) is then transformed to the time domain by an inverse fast Fourier transformer (IFFT) 116 to provide OFDM symbols, with each OFDM symbol corresponding to a time representation of a vector of $N_F$ modulation symbols to be transmitted on $N_F$ frequency subchannels in a transmission symbol period. In contrast to a single carrier "time-coded" system, the OFDM system effectively transmits the modulation symbols "in the frequency domain", by sending in the time domain the IFFT of the modulation symbols that represent the traffic data. The OFDM symbols are further processed (not shown in FIG. 1A for simplicity) to generate a modulated signal, which is then transmitted over a wireless communication channel to the receiver. As shown in FIG. 1A, the communication channel has a frequency response of H(f) and further degrades the modulated signal with additive white Gaussian noise (AWGN) of n(t).

At receiver 150, the transmitted modulated signal is received, conditioned, and digitized to provide data samples. A fast Fourier transformer (FFT) 160 then receives and transforms the data samples to the frequency domain, and the recovered OFDM symbols are provided to a demodulator/decoder 162 and a channel estimator 164. Demodulator/decoder 162 processes (e.g., demodulates and decodes) the recovered OFDM symbols to provide decoded data, and may further provide a status of each received packet. Channel estimator 164 processes the recovered OFDM symbols to provide estimates of one or more characteristics of the communication channel, such as the channel frequency response, the channel noise variance, the signal-to-noise-and-interference ratio (SNR) of the received symbols, and so on.

A rate selector 166 receives the estimates from channel estimator 164 and determines a suitable "rate" that may be used for all or a subset of the frequency subchannels available for use for data transmission. The rate is indicative of a set of specific values for a set of parameters. For example, the rate may indicate (or may be associated with) a specific data rate to be used for the data transmission, a specific coding scheme and/or coding rate, a specific modulation scheme, and so on.

A controller 170 receives the rate from rate selector 166 and the packet status from demodulator/decoder 162 and provides the appropriate feedback information to be sent back to transmitter 110. This feedback information may include the rate, the channel estimates provided by channel estimator 164, an acknowledgment (ACK) or negative acknowledgment (NACK) for each received packet, some other information, or any combination thereof. The feedback information is used to increase the efficiency of the system by adjusting the data processing at the transmitter such that the data transmission is performed at the best known settings of power and rate that may be supported by the communication channel. The feedback information is then sent back to transmitter 110 and used to adjust the processing (e.g., the data rate, coding, and modulation) of the data transmission to receiver 150.

In the embodiment shown in FIG. 1A, the rate selection is performed by receiver 150 and the selected rate is provided to transmitter 110. In other embodiments, the rate selection may be performed by the transmitter based on feedback information provided by the receiver, or may be performed jointly by both the transmitter and receiver.

Under suitable conditions, the recovered OFDM symbols at the output of FFT 160 may be expressed as:

$$\hat{Y}(k) = Y(k)H(k) + N(k), \qquad \text{Eq (1)}$$

where k is an index for the frequency subchannels of the OFDM system, i.e., $k = 0, 1, \ldots, N_F - 1$, where $N_F$ is the number of frequency subchannels;

Y(k) are the modulation symbols transmitted on the k-th frequency subchannel, which are derived based on a particular modulation scheme used for the k-th frequency subchannel;

H(k) is the frequency response of the communication channel, represented in "quantized" form for each frequency subchannel;

N(k) represents the FFT of a sequence of $N_F$ samples of the time-domain noise, i.e., $FFT\{n(kT)\}$ for $k = 0, 1, \ldots, N_F - 1$; and T is the sampling period.

In a single carrier system, the transmitted symbols may all be received at the receiver at approximately the same SNR. The relationship between the SNR of a "constant SNR" packet and the probability of error for the packet is well known in the art. As an approximation, the maximum data rate supported by the single carrier system with a particular achieved SNR may be estimated as the maximum data rate supported by an AWGN channel with the same SNR. The main characteristic of the AWGN channel is that its frequency response is flat or constant across the entire system bandwidth.

However, in an OFDM system, the modulation symbols that make up a packet are transmitted across multiple frequency subchannels. Depending on the frequency response of the frequency subchannels used to transmit the packet, the SNR may vary across the entire packet. This problem of "varying SNR" packet is exacerbated as the system bandwidth increases and for a multipath environment.

A major challenge for an OFDM system is then to determine the maximum data rate that may be used for data transmission while achieving a particular level of performance, which may be quantified by a particular packet error rate (PER), frame error rate (FER), bit error rate (BER), or some other criterion. For example, the desired level of performance may be achieved by maintaining the PER within a small window around a particular nominal value (e.g., $P_e=1\%$).

In a typical communication system, a set of specific and discrete data rates may be defined, and only these data rates may be available for use. Each data rate, D(r), may be associated with a specific modulation scheme or constellation, M(r), and a specific coding rate, C(r). Each data rate would further require a particular SNR(r), which is the minimum SNR at which the resulting PER for the data transmission at that data rate is less than or equal to the desired PER, $P_e$. This SNR(r) assumes that the communication channel is AWGN (i.e., with a flat frequency response across the entire system bandwidth, or H(k)=H for all k). Typically, the communication channel between the transmitter and receiver is not AWGN, but is instead dispersive or frequency selective (i.e., different amounts of attenuation at different sub-bands of the system bandwidth). For such a multipath channel, the particular data rate to be used for data transmission may be selected to account for the multipath or frequency selective nature of the channel.

Each data rate, D(r), may thus be associated with a set of parameters that characterizes it. These parameters may include the modulation scheme M(r), the coding rate C(r), and the required SNR(r), as follows:

$$D(r) \longleftrightarrow [M(r), C(r), SNR(r)], \qquad \text{Eq (2)}$$

where r is an index for the data rates, i.e., $r=0, 1, \ldots, N_R-1$, where $N_R$ is the total number of data rates available for use. Expression (2) states that data rate D(r) may be transmitted using modulation scheme M(r) and coding rate C(r) and further requires SNR(r) in an AWGN channel to achieve the desired nominal PER $P_e$. The $N_R$ data rates may be ordered such that $D(0)<D(1)<D(2) \ldots <D(N_R-1)$.

In accordance with an aspect of the invention, the maximum data rate that may be reliably transmitted over a given multipath channel in an OFDM system is determined based on a metric for an equivalent AWGN channel. Reliable transmission is achieved if the desired PER of $P_e$ is maintained for the data transmission. Details of this aspect are described below.

Figure 1B:
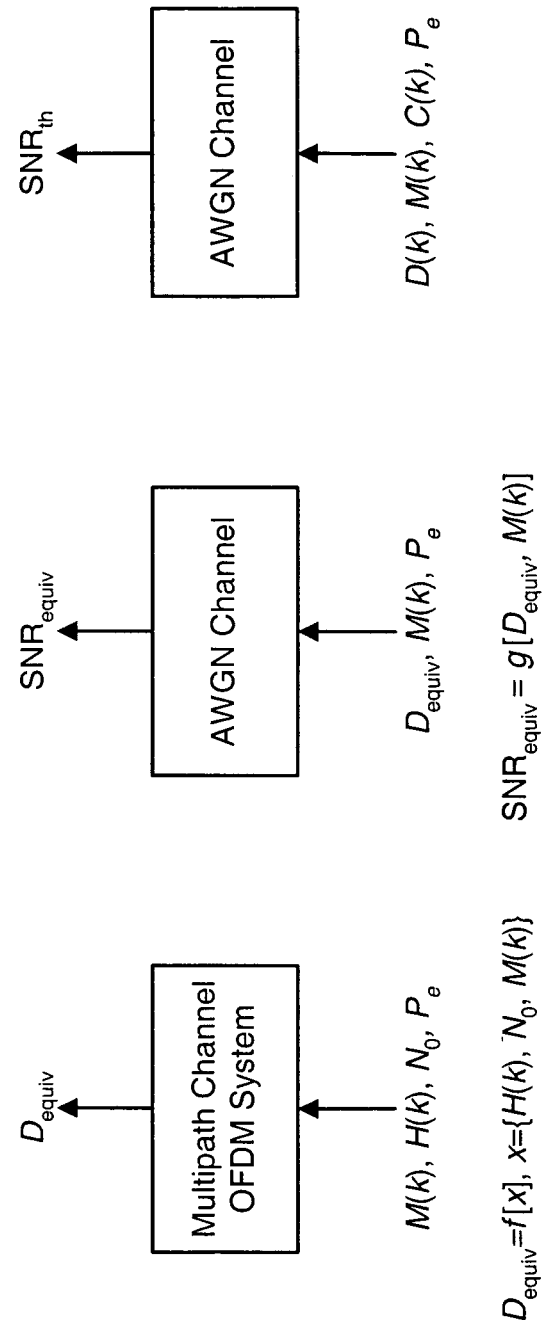
FIG. 1B is a diagram that graphically illustrates rate selection for a multipath channel using an equivalent channel.

FIG. 1B is a diagram that graphically illustrates the rate selection for a multipath channel using an equivalent channel. For a given multipath channel defined by a channel response of H(k) and a noise variance of $N_0$, the OFDM system may be capable of achieving an equivalent data rate of $D_{equiv}$ using modulation scheme M(k), where M(k) may be different for different frequency subchannels. This $D_{equiv}$ may be estimated as described below based on a particular channel capacity function $f[H(k), N_0, M(k)]$. Since the bandwidth of each individual frequency subchannel is normalized to 1, it does not appear as an argument of the function $f[\cdot]$. The metric, which is an estimate of the SNR, $SNR_{equiv}$, required by an equivalent AWGN channel to transmit at the equivalent data rate of $D_{equiv}$ using modulation scheme M(k) at the desired PER of $P_e$, may be derived for $D_{equiv}$ using M(k) and further based on a function $g(D_{equiv}, M(k))$ that is also described below.

For a data rate D(k), modulation scheme M(k), and coding rate C(k), the AWGN channel would need an SNR of $SNR_{th}$ or better to achieve the desired PER of $P_e$. This threshold $SNR_{th}$ may be determined by computer simulation or some other means. The data rate D(k) may then be deemed as being supported by the OFDM system for the multipath channel if the metric (or $SNR_{equiv}$) is equal to or greater than $SNR_{th}$. As the data rate D(k) increases, the threshold $SNR_{th}$ increases for the given channel conditions defined by H(k) and $N_0$. The maximum data rate that may be supported by the OFDM system is thus limited by the channel conditions. Various schemes are provided herein to determine the maximum data rate that may be supported by the OFDM system for the given multipath channel. Some of these schemes are described below.

In a first rate selection scheme, the metric $\Psi$ receives a set of parameters for a data transmission on a given multipath channel in an OFDM system and, based on the received parameters, provides an estimate of the SNR for an AWGN channel equivalent to the multipath channel. These input parameters to the metric $\Psi$ may include one or more parameters related to the processing of the data transmission (e.g., the modulation scheme M(k)) and one or more parameters related to the communication channel (e.g., the channel response H(k) and the noise variance $N_0$). As noted above, the modulation scheme M(k) may be associated with a specific data rate D(k). The metric T is the estimate of the SNR of the equivalent AWGN channel (i.e., $\Psi \approx SNR_{equiv}$). The maximum data rate supported by the multipath channel may then be determined as the highest data rate associated with an equivalent SNR that is greater than or equal to the threshold SNR, $SNR_{th}$, required on the AWGN channel to achieve the desired PER of $P_e$ using the coding and modulation schemes associated with the data rate.

Various functions may be used for the metric $\Psi$, some of which are provided below. In an embodiment, the metric $\Psi$ is defined as:

$$\Psi = g\left\{\left(\sum_{k=0}^{N_F-1} f[H(k), N_o, M]\right), M\right\}. \qquad \text{Eq (3)}$$

In equation (3), the function $f[H(k), N_0, M]$ determines the maximum data rate that modulation scheme M can carry on the k-th frequency subchannel with the frequency response H(k) and the noise variance $N_0$. The function $f[H(k), N_0, M]$ may be defined based on various channel capacity functions, as described below.

The parameters H(k) and $N_0$ may be mapped to an SNR(k). If the total transmit power, $P_{total}$, for the system is fixed and the allocation of the transmit power to the $N_F$ frequency subchannels is uniform and fixed, then the SNR for each frequency subchannel may be expressed as:

$$SNR(k) = \frac{P_{total}}{N_F} \frac{|H(k)|^2}{N_0}. \qquad \text{Eq (4)}$$

As shown in equation (4), SNR(k) is a function of the channel response H(k) and the noise variance $N_0$, which are two of the parameters of the function $f[H(k),N_0,M]$.

The summation in equation (3) is performed for $f[\cdot]$ over all $N_F$ frequency subchannels to provide the equivalent data rate $D_{equiv}$ that may be transmitted on the AWGN channel. The function $g(D_{equiv},M)$ then determines the SNR needed in the AWGN channel to reliably transmit at the equivalent data rate $D_{equiv}$ using the modulation scheme M.

Equation (3) assumes that the same modulation scheme M is used for all $N_F$ frequency subchannels in the OFDM system. This restriction results in simplified processing at the transmitter and receiver in the OFDM system but may sacrifice performance.

If different modulation schemes may be used for different frequency subchannels, then the metric $\Psi$ may be defined as:

$$\Psi = \sum_{k=0}^{N_F-1} g(f[H(k), N_0, M(k)], M(k)). \qquad \text{Eq (5)}$$

As shown in equation (5), the modulation scheme, M(k), is a function of the index k of the frequency subchannels. The use of different modulation schemes and/or coding rates for different frequency subchannels is also referred to as "bit loading".

The function $f[x]$ determines the data rate that may be reliably transmitted over the AWGN channel for a set of parameters collectively represented as x, where x may be a function of frequency (i.e., x(k)). In equation (5), the function $f[H(k),N_0,M(k)]$, where $x(k)=\{H(k),N_0,M(k)\}$, determines the data rate that modulation scheme M(k) can carry on the k-th frequency subchannel with the channel response H(k) and the noise variance $N_0$. The function $g(f[x(k)],M(k))$ then determines the SNR needed in the equivalent AWGN channel to carry the data rate determined by $f[x(k)]$. The summation in equation (5) is then performed for $g(f[x(k)],M(k))$ over all $N_F$ frequency subchannels to provide the estimate of the SNR for the equivalent AWGN channel, $SNR_{equiv}$.

The function $f[x]$ may be defined based on various channel capacity functions or some other functions or techniques. The absolute capacity of a system is typically given as the theoretical maximum data rate that may be reliably transmitted for the channel response H(k) and the noise variance $N_0$. The "constrained" capacity of a system depends on the specific modulation scheme or constellation, M(k), used for data transmission and is lower than the absolute capacity.

In one embodiment, the function $f[H(k),N_0,M(k)]$ is defined based on the constrained channel capacity function and may be expressed as:

where $M_k$ is related to the modulation scheme M(k), i.e., the modulation scheme M(k) corresponds to a $2^{M_k}$-ary constellation (e.g., $2^{M_k}$-ary QAM), where each of the $2^{M_k}$ points in the constellation may be identified by $M_k$ bits; $a_i$ and $a_j$ are the points in the $2^{M_k}$-ary constellation;

x is a complex Gaussian random variable with zero mean and a variance of 1/SNR(k); and E $[\cdot]$ is the expectation operation, which is taken with respect to the variable x in equation (6).

The constrained channel capacity function shown in equation (6) does not have a closed form solution. Thus, this function may be numerically derived for various modulation schemes and SNR values, and the results may be stored to one or more tables. Thereafter, the function $f[x]$ may be evaluated by accessing the proper table with a specific modulation scheme and SNR.

In another embodiment, the function $f[x]$ is defined based on the Shannon (or theoretical) channel capacity function and may be expressed as:

$$f(k)=\log_2[1+SNR(k)], \qquad \text{Eq (7)}$$

where W is the system bandwidth. As shown in equation (7), the Shannon channel capacity is not constrained by any given modulation scheme (i.e., M(k) is not a parameter in equation (7)).

The particular choice of function to use for $f[x]$ may be dependent on various factors, such as the OFDM system design. For a typical system that employs one or more specific modulation schemes, it has been found that the matrix $\Psi$ defined as shown in equation (3), when used in conjunction with the constrained channel capacity for the function $f[x]$ as shown in equation (6), is an accurate estimator of the maximum supported data rate for the OFDM system for the AWGN channel as well as for the multipath channel.

The function $g(f[x],M(k))$ determines the SNR needed in the AWGN channel to support the equivalent data rate, which is determined by the function $f[x]$, using the modulation scheme M(k). In one embodiment, the function $g(f[x],M(k))$ is defined as:

$$g(f[x],M(k))=f[x]^{-1}. \qquad \text{Eq (8)}$$

Since the function $f[x]$ is dependent on the modulation scheme M(k), the function $g(f[x],M(k))$ is also dependent on the modulation scheme. In one implementation, the function $f[x]^{-1}$ may be derived for each modulation scheme that may be selected for use and may be stored to a respective table. The function $g(f[x],M(k))$ may then be evaluated for a given value of $f[x]$ by accessing the specific table for the modulation scheme M(k). The function $g(f[x],M(k))$ may also be defined using other functions or derived by other means, and this is within the scope of the invention.

Figure 2:
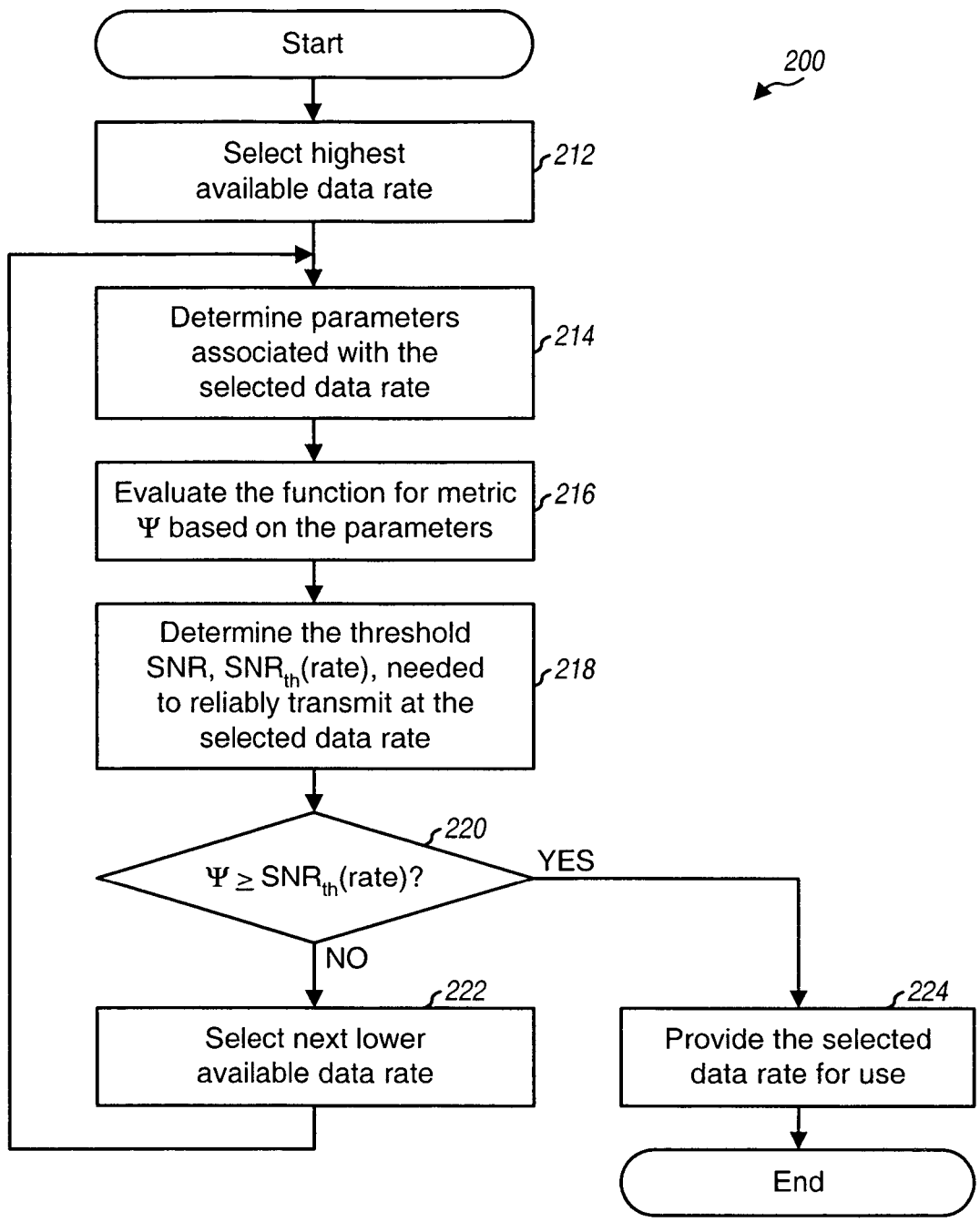
FIG. 2 is a flow diagram of an embodiment of a process for selecting data rate for use in the OFDM system based on a metric $\Psi$.

FIG. 2 is a flow diagram of an embodiment of a process 200 for selecting data rate for use in the OFDM system based on the metric $\Psi$. Initially, the available data rates (i.e., those supported by the OFDM system) are ordered such that $D(0)<D(1)<\ldots<D(N_R-1)$. The highest available data rate is then selected (e.g., by setting a rate variable to the index for the highest data rate, or rate=$N_R-1$), at step 212. Various param- $$f(k) = M_k - \frac{1}{2^{M_k}} \sum_{i=1}^{2^{M_k}} E\left[\log_2 \sum_{j=1}^{2^{M_k}} \exp(-SNR(k)(|a_i - a_j|^2 + 2\text{Re}\{x^*(a_i - a_j)\}))\right], \qquad \text{Eq (6)}$$

eters associated with the selected data rate D(rate), such as the modulation scheme M(rate), are then determined, at step 214. Depending on the design of the OFDM system, each data rate may be associated with one or multiple modulation schemes. Each modulation scheme of the selected data rate may then be evaluated based on the following step. For simplicity, the following assumes that only one modulation scheme is associated with each data rate.

The metric $\Psi$ is then evaluated for the specific modulation scheme M(rate) associated with the selected data rate D(rate), at step 216. This may be achieved by evaluating the function for the metric $\Psi$, as shown in equation (3), which is:

$$\Psi = g\left\{\left(\sum_{k=0}^{N_F-1} f[H(k), N_0, M(\text{rate})]\right), M(\text{rate})\right\}.$$

The metric $\Psi$ represents an estimate of the SNR needed in the equivalent AWGN channel to reliably transmit the equivalent data rate using the modulation scheme M(rate).

The threshold SNR, $SNR_{th}$(rate), needed to transmit the selected data rate D(rate) with the desired PER of $P_e$ in the AWGN channel is then determined, at step 218. The threshold $SNR_{th}$(rate) is a function of the modulation scheme M(rate) and the coding rate C(rate) associated with the selected data rate. The threshold SNR may be determined for each of the possible data rates via computer simulation or by some other means, and may be stored for later use.

A determination is then made whether or not the metric $\Psi$ is greater than or equal to the threshold $SNR_{th}$(rate) associated with the selected data rate, at step 220. If the metric $\Psi$ is greater than or equal to $SNR_{th}$(rate), which indicates that the SNR achieved by the OFDM system for the data rate D(rate) in the multipath channel is sufficient to achieve the desired PER of $P_e$, then that data rate is selected for use, at step 224. Otherwise, the next lower available data rate is selected for evaluation (e.g., by decrementing the rate variable by one, or rate=rate−1), at step 222. The next lower data rate is then evaluated by returning to step 214. Steps 214 through 222 may be repeated as often as needed until the maximum supported data rate is identified and provided in step 222.

The metric $\Psi$ is a monotonic function of data rate and increases with increasing data rate. The threshold SNR is also a monotonic function that increases with increasing data rate. The embodiment shown in FIG. 2 evaluates the available data rates, one at a time, from the maximum available data rate to the minimum available data rate. The highest data rate associated with a threshold SNR, $SNR_{th}$(rate), that is smaller than or equal to the metric $\Psi$ is selected for use.

In another embodiment, the metric $\Psi$ may be evaluated for a particular modulation scheme M(r) to derive an estimate of the SNR for the equivalent AWGN channel, $SNR_{equiv}(r)$. The maximum data rate, $D_{max}(r)$, supported by the AWGN channel for the desired PER at this equivalent SNR using the modulation scheme M(r) is then determined (e.g., via a look-up table). The actual data rate to be used in the OFDM system for the multipath channel may then be selected to be less than or equal to the maximum data rate, $D_{max}(r)$, supported by the AWGN channel.

In a second rate selection scheme, the metric $\Psi$ is defined as a post-detection SNR achieved for the multipath channel by a single carrier system after equalization. The post-detection SNR is representative of the ratio of the total signal power to the noise plus interference after equalization at the receiver. Theoretical values of post-detection SNR achieved in the single carrier system with equalization may be indicative of the performance of an OFDM system, and therefore may be used to determine the maximum supported data rate in the OFDM system. Various types of equalizer may be used to process the received signal in the single carrier system to compensate for distortions in the received signal introduced by the multipath channel. Such equalizers may include, for example, a minimum mean square error linear equalizer (MMSE-LE), a decision feedback equalizer (DFE), and others.

The post-detection SNR for an (infinite-length) MMSE-LE may be expressed as:

$$SNR_{mmse-le} = \frac{1 - J_{\min}}{J_{\min}}, \qquad \text{Eq (9a)}$$

where $J_{min}$ is given by $$J_{\min} = \frac{T}{2\pi} \int_{-\pi/T}^{\pi/T} \frac{N_0}{X(e^{j\omega T}) + N_0} d\omega, \qquad \text{Eq (9b)}$$

where $X(e^{j\omega T})$ is the folded spectrum of the channel transfer function H(f).

The post-detection SNR for an (infinite-length) DFE may be expressed as:

$$SNR_{dfe} = \exp\left[\frac{T}{2\pi} \int_{-\pi/T}^{\pi/T} \ln\left(\frac{X(e^{j\omega T}) + N_0}{N_0}\right) d\omega\right] - 1. \qquad \text{Eq (10)}$$

The post-detection SNRs for the MMSE-LE and DFE shown in equations (9) and (10), respectively, represent theoretical values. The post-detection SNRs for the MMSE-LE and DFE are also described in further detail by J. G. Proakis, in a book entitled "Digital Communications", 3rd Edition, 1995, McGraw Hill, sections 10-2-2 and 10-3-2, respectively, which are incorporated herein by reference.

The post-detection SNRs for the MMSE-LE and DFE may also be estimated at the receiver based on the received signal, as described in U.S. application Ser. Nos. 09/826,481 and 09/956,449, both entitled "Method and Apparatus for Utilizing Channel State Information in a Wireless Communication System," respectively filed Mar. 23, 2001 and Sep. 18, 2001, and U.S. patent application Ser. No. 09/854,235, entitled "Method and Apparatus for Processing Data in a Multiple-Input Multiple-Output (MIMO) Communication System Utilizing Channel State Information," filed May 11, 2001, all assigned to the assignee of the present application and incorporated herein by reference.

Post-detection SNRs, such as those described by the analytical expressions shown in equations (9) and (10), may be determined for the multipath channel and used as an estimate of the metric $\Psi$ (i.e., $\Psi \approx SNR_{mmse-le}$ or $\Psi \approx SNR_{dfe}$). The post-detection SNR (e.g., $SNR_{mmse-le}$ or $SNR_{dfe}$) for the equivalent AWGN channel may be compared against the threshold SNR, $SNR_{th}$, derived for a particular set of parameters, D(r), M(r), C(r), and $P_e$, to determine the data rate that may be used in the OFDM system for the multipath channel.

The metric $\Psi$ may also be defined based on some other functions, and the equivalent data rate may also be estimated based on some other techniques, and this is within the scope of the invention.

The data rate selected for use in the OFDM system based on the metric T represents a prediction of the data rate that may be supported by the multipath channel for the desired PER of $P_e$. As with any rate prediction scheme, there will inevitably be prediction errors. In order to ensure that the desired PER can be achieved, the prediction errors may be estimated and a back-off factor may be used in determining the data rate that can be supported by the multipath channel. This back-off reduces the throughput of the OFDM system. Thus, it is desirable to keep this back-off as small as possible while still achieving the desired PER.

In accordance with another aspect of the invention, an incremental transmission (IT) scheme is provided and may be advantageously used in conjunction with the rate selection of the first aspect to reduce the amount of back-off and to improve system throughput. The IT scheme transmits a given packet using one or more discrete transmissions, one transmission at a time and up to a particular limit. The first transmission for the packet includes sufficient amount of data such that the packet can be recovered error-free at the receiver based on the expected channel conditions. However, if the first transmission is excessively degraded by the communication channel such that error-free recovery of the packet is not achieved, then an incremental transmission of an additional amount of data for the packet is performed. The receiver then attempts to recover the packet based on the additional data in the incremental transmission and all data previously received for the packet. The incremental transmission by the transmitter and the decoding by the receiver may be attempted for one or more times, until the packet is recovered error-free or the maximum number of incremental transmissions is reached.

An embodiment of the IT scheme may be implemented as follows. First, the data for a packet is coded using a lower coding rate (for a forward error correction code) than the coding rate that may be used for the packet without any incremental transmission. Next, some of the coded bits for the packet are punctured and only a subset of all the coded bits is transmitted for the first transmission of the packet. If the packet is correctly received, then the receiver may send back an acknowledgement (ACK) indicating that the packet was received error-free. Alternatively, the receiver may send back a negative acknowledgement (NACK) if it receives the packet in error.

In either case, if the acknowledgement is not received by the transmitter for the packet or a negative acknowledgement is received, then the transmitter sends an incremental packet to the receiver. This incremental packet may include some of the original punctured coded bits that were not sent in the first transmission. The receiver then attempts to decode the packet by using the coded bits sent in both the first transmission as well as the second transmission. The additional coded bits from the second transmission provide more energy and improve the error correction capability. One or more incremental transmissions may be performed, typically one at a time until the acknowledgement is received or the negative acknowledgement is not received.

If incremental transmission is employed by the system, then a smaller back-off may be used to account for rate prediction errors and more aggressive rate selections may be made. This may result in improved system throughput.

The incremental transmission in combination with the rate selection described above also provides an efficient mechanism for determining the maximum data rate supported by fixed or slow-varying communication channels. Consider a fixed-access application where the multipath profile of the channel changes slowly. In this case, an initial data rate may be selected based on the techniques described above and used for data transmission. If the initial data rate is higher than the channel can support, then the IT scheme can transmit additional coded bits until the packet can be correctly decoded at the receiver. The maximum data rate that the channel can support may then be determined based on the total number of coded bits sent in the first transmission and any subsequent incremental transmissions. If the channel changes slowly, then the determined data rate may be used until the channel changes, at which time a new data rate may be determined.

The incremental transmission thus provides numerous advantages. First, the use of incremental transmission allows for an aggressive data rate selection to increase system throughput. Second, incremental transmission provides a means for remedying prediction errors that inevitably arise for any rate prediction scheme (with the frequency and magnitude of the prediction errors being dependent on the amount of back-off employed). And third, incremental transmission provides a mechanism to more accurately determine the maximum supported data rate for fixed or slow-varying channels.

Figure 3:
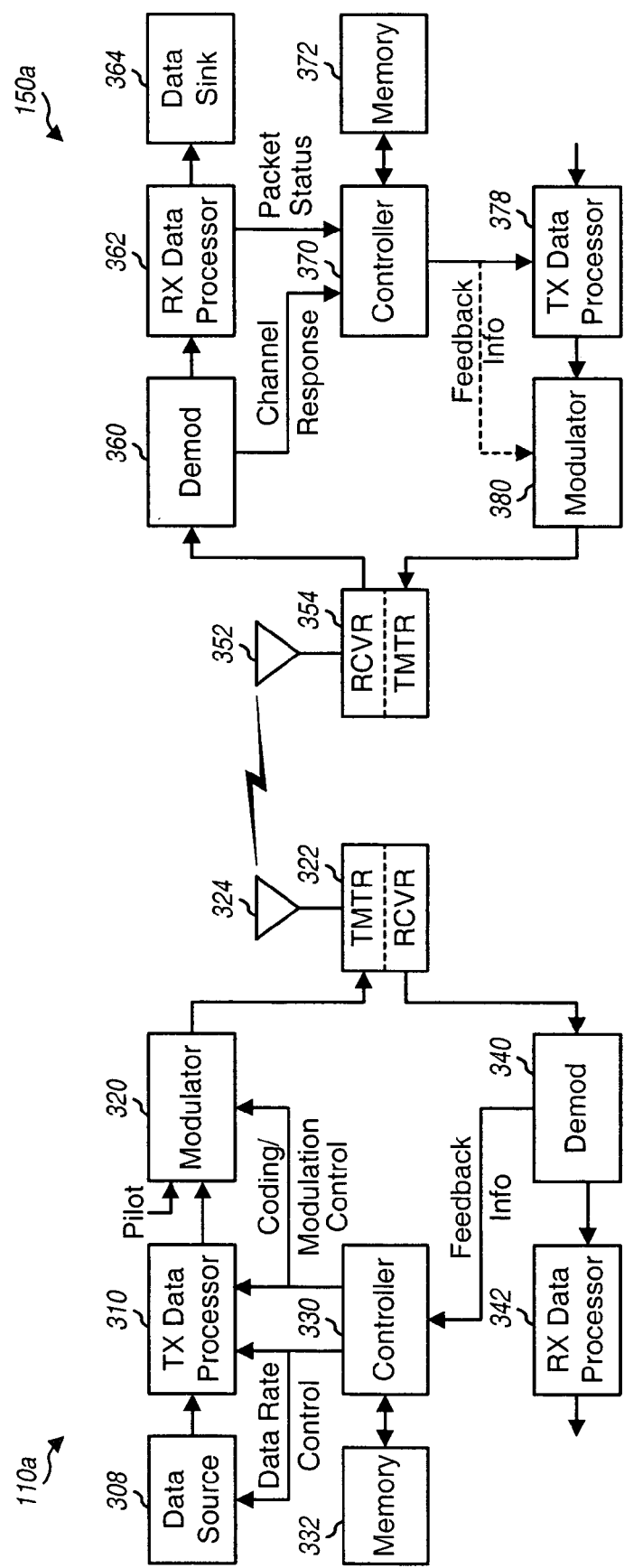
FIG. 3 is a block diagram of an embodiment of a transmitter system and a receiver system, which are capable of implementing various aspects and embodiments of the invention.

FIG. 3 is a block diagram of an embodiment of a transmitter system 110a and a receiver system 150a, which are capable of implementing various aspects and embodiments of the invention.

At transmitter system 110a, traffic data is provided at a particular data rate from a data source 308 to a transmit (TX) data processor 310, which formats, interleaves, and codes the traffic data based on a particular coding scheme to provide coded data. The data rate and the coding may be determined by a data rate control and a coding control, respectively, provided by a controller 330.

The coded data is then provided to a modulator 320, which may also receive pilot data (e.g., data of a known pattern and processed in a known manner, if at all). The pilot data may be multiplexed with the coded traffic data, e.g., using time division multiplex (TDM) or code division multiplex (CDM), in all or a subset of the frequency subchannels used to transmit the traffic data. In a specific embodiment, for OFDM, the processing by modulator 320 includes (1) modulating the received data with one or more modulation schemes, (2) transforming the modulated data to form OFDM symbols, and (3) appending a cyclic prefix to each OFDM symbol to form a corresponding transmission symbol. The modulation is performed based on a modulation control provided by controller 330. The modulated data (i.e., the transmission symbols) is then provided to a transmitter (TMTR) 322.

Transmitter 322 converts the modulated data into one or more analog signals and further conditions (e.g., amplifies, filters, and quadrature modulates) the analog signals to generate a modulated signal suitable for transmission over the communication channel. The modulated signal is then transmitted via an antenna 324 to the receiver system.

At receiver system 150a, the transmitted modulated signal is received by an antenna 352 and provided to a receiver (RCVR) 354. Receiver 354 conditions (e.g., filters, amplifies, and downconverts) the received signal and digitizes the conditioned signal to provide data samples. A demodulator (Demod) 360 then processes the data samples to provide demodulated data. For OFDM, the processing by demodulator 360 may include (1) removing the cyclic prefix previously appended to each OFDM symbol, (2) transforming each recovered OFDM symbol, and (3) demodulating the recovered modulation symbols in accordance with one or more demodulation schemes complementary to the one or more modulation schemes used at the transmitter system.

A receive (RX) data processor 362 then decodes the demodulated data to recover the transmitted traffic data. The processing by demodulator 360 and RX data processor 362 is complementary to that performed by modulator 320 and TX data processor 310, respectively, at transmitter system 110a.

As shown in FIG. 3, demodulator 360 may derive estimates of the channel response, Ĥ(k), and provide these estimates to a controller 370. RX data processor 362 may also derive and provide the status of each received packet and may further provide one or more other performance metrics indicative of the decoded results. Based on the various types of information received from demodulator 360 and RX data processor 362, controller 370 may determine or select a particular rate for the data transmission based on the techniques described above. Feedback information in the form of a selected rate, the channel response estimates, ACK/NACK for the receive packet, and so on, may be provided by controller 370, processed by a TX data processor 378, modulated by a modulator 380, and conditioned and transmitted by a transmitter 354 back to transmitter system 110a.

At transmitter system 110a, the modulated signal from receiver system 150a is received by antenna 324, conditioned by a receiver 322, and demodulated by a demodulator 340 to recover the feedback information transmitted by the receiver system. The feedback information is then provided to controller 330 and used to control the processing of the data transmission to the receiver system. For example, the data rate of the data transmission may be determined based on the selected rate provided by the receiver system, or may be determined based on the channel response estimates from the receiver system. The specific coding and modulation schemes associated with the selected rate are determined and reflected in the coding and modulation control provided to TX data processor 310 and modulator 320. The received ACK/NACK may be used to initiate an incremental transmission (not shown in FIG. 3 for simplicity).

Controllers 330 and 370 direct the operation at the transmitter and receiver systems, respectively. Memories 332 and 372 provide storage for program codes and data used by controllers 330 and 370, respectively.

Figure 4:
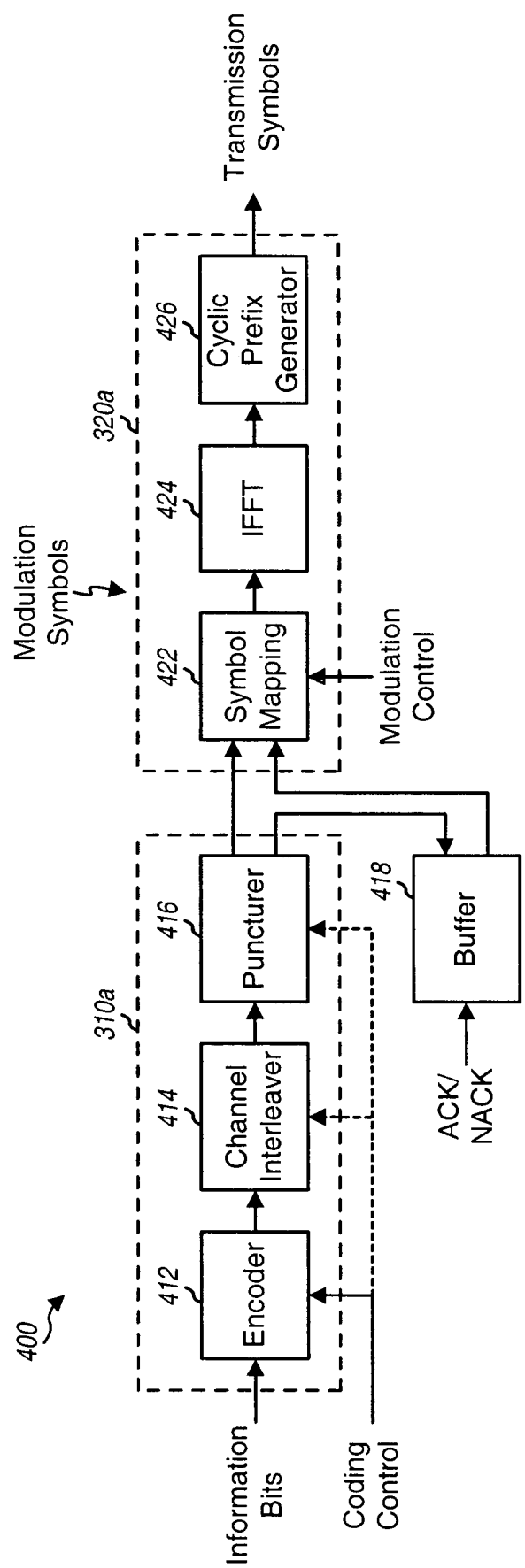
FIG. 4 is a block diagram of an embodiment of a transmitter unit.

FIG. 4 is a block diagram of a transmitter unit 400, which is an embodiment of the transmitter portion of transmitter system 110a. Transmitter unit 400 includes (1) a TX data processor 310a that receives and processes traffic data to provide coded data and (2) a modulator 320a that modulates the coded data to provided modulated data. TX data processor 310a and modulator 320a are one embodiment of TX data processor 310 and modulator 320, respectively, in FIG. 3.

In the specific embodiment shown in FIG. 4, TX data processor 310a includes an encoder 412, a channel interleaver 414, and a puncturer 416. Encoder 412 receives and codes the traffic data in accordance with one or more coding schemes to provide coded bits. The coding increases the reliability of the data transmission. Each coding scheme may include any combination of CRC coding, convolutional coding, Turbo coding, block coding, and other coding, or no coding at all. The traffic data may be partitioned into packets (or frames), and each packet may be individually processed and transmitted. In an embodiment, for each packet, the data in the packet is used to generate a set of CRC bits, which is appended to the data, and the data and CRC bits are then coded with a convolutional code or a Turbo code to generate the coded data for the packet.

Channel interleaver 414 then interleaves the coded bits based on a particular interleaving scheme to provide diversity. The interleaving provides time diversity for the coded bits, permits the data to be transmitted based on an average SNR for the frequency subchannels used for the data transmission, combats fading, and further removes correlation between coded bits used to form each modulation symbol. The interleaving may further provide frequency diversity if the coded bits are transmitted over multiple frequency subchannels.

Puncturer 416 then punctures (i.e., deletes) zero or more of the interleaved coded bits and provides the required number of unpunctured coded bits to modulator 320a. Puncturer 416 may further provide the punctured coded bits to a buffer 418, which stores these coded bits in case they are needed for an incremental transmission at a later time, as described above.

In the specific embodiment shown in FIG. 4, modulator 320a includes a symbol mapping element 422, an IFFT 424, and a cyclic prefix generator 426. Symbol mapping element 422 maps the multiplexed pilot data and coded traffic data to modulation symbols for one or more frequency subchannels used for data transmission. One or more modulation schemes may be used for the frequency subchannels, as indicated by the modulation control. For each modulation scheme selected for use, the modulation may be achieved by grouping sets of received bits to form multi-bit symbols and mapping each multi-bit symbol to a point in a signal constellation corresponding to the selected modulation scheme (e.g., QPSK, M-PSK, M-QAM, or some other scheme). Each mapped signal point corresponds to a modulation symbol. Symbol mapping element 422 then provides a vector of (up to $N_F$) modulation symbols for each transmission symbol period, with the number of modulation symbols in each vector corresponding to the number of (up to $N_F$) frequency subchannels selected for use for that transmission symbol period.

IFFT 424 converts each modulation symbol vector into its time-domain representation (which is referred to as an OFDM symbol) using the inverse fast Fourier transform. IFFT 424 may be designed to perform the inverse transform on any number of frequency subchannels (e.g., 8, 16, 32, . . . , $N_F$, . . . ). In an embodiment, for each OFDM symbol, cyclic prefix generator 426 repeats a portion of the OFDM symbol to form a corresponding transmission symbol. The cyclic prefix ensures that the transmission symbol retains its orthogonal properties in the presence of multipath delay spread, thereby improving performance against deleterious path effects. The transmission symbols from cyclic prefix generator 426 are then provided to transmitter 322 (see FIG. 3) and processed to generate a modulated signal, which is then transmitted from antenna 324.

Other designs for the transmitter unit may also be implemented and are within the scope of the invention. The implementation of encoder 412, channel interleaver 414, puncturer 416, symbol mapping element 422, IFFT 424, and cyclic prefix generator 426 is known in the art and not described in detail herein.

The coding and modulation for OFDM and other systems are described in further detail in the aforementioned U.S. patent application Ser. Nos. 09/826,481, 09/956,449, and 09/854,235, U.S. patent application Ser. No. 09/776,075, entitled "Coding Scheme for a Wireless Communication System," filed Feb. 1, 2001, and U.S. patent application Ser. No. 09/993,087, entitled "Multiple-Access Multiple-Input Multiple-Output (MIMO) Communication System," filed Nov. 6, 2001, all assigned to the assignee of the present application and incorporated herein by reference.

An example OFDM system is described in U.S. patent application Ser. No. 09/532,492, entitled "High Efficiency, High Performance Communication System Employing Multi-Carrier Modulation," filed Mar. 30, 2000, assigned to the assignee of the present invention and incorporated herein by reference. OFDM is also described in a paper entitled "Multicarrier Modulation for Data Transmission: An Idea Whose Time Has Come," by John A. C. Bingham, IEEE Communications Magazine, May 1990, which is incorporated herein by reference.

Figure 5:
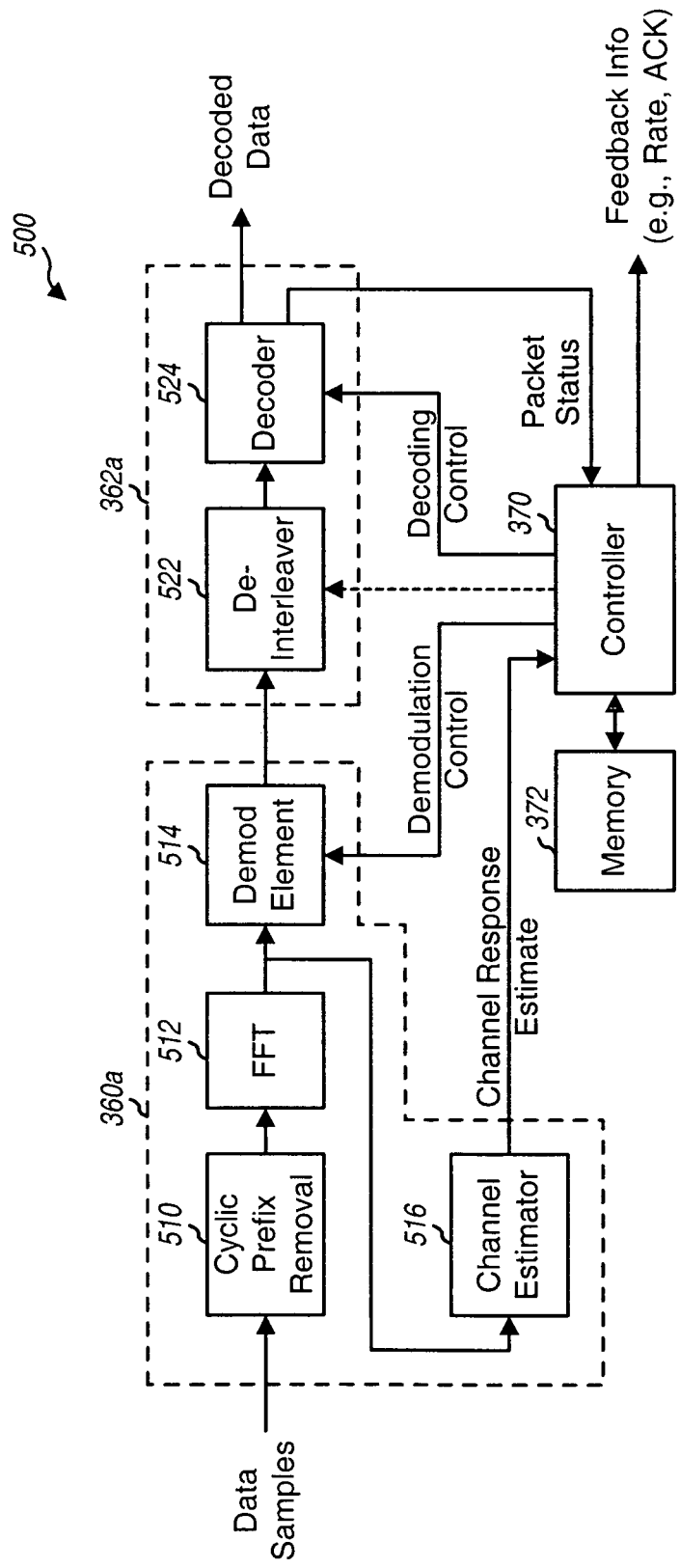
FIG. 5 is a block diagram of an embodiment of a receiver unit.

FIG. 5 is a block diagram of an embodiment of a receiver unit 500, which is one embodiment of the receiver portion of receiver system 150a in FIG. 3. The transmitted signal from the transmitter system is received by antenna 352 (FIG. 3) and provided to receiver 354 (which may also be referred to as a front-end processor). Receiver 354 conditions (e.g., filters and amplifies) the received signal, downconverts the conditioned signal to an intermediate frequency or baseband, and digitizes the downconverted signal to provide data samples, which are then provided to a demodulator 360a.

Within demodulator 360a (FIG. 5), the data samples are provided to a cyclic prefix removal element 510, which removes the cyclic prefix included in each transmission symbol to provide a corresponding recovered OFDM symbol. A FFT 512 then transforms each recovered OFDM symbol using the fast Fourier transform and provides a vector of (up to $N_F$) recovered modulation symbols for the (up to $N_F$) frequency subchannels used for data transmission for each transmission symbol period. The recovered modulation symbols from FFT 512 are provided to a demodulation element 514 and demodulated in accordance with one or more demodulation schemes that are complementary to the one or more modulation schemes used at the transmitter system. The demodulated data from demodulation element 514 are then provided to a RX data processor 362a.

Within RX data processor 362a, the demodulated data is de-interleaved by a de-interleaver 522 in a manner complementary to that performed at the transmitter system, and the de-interleaved data is further decoded by a decoder 524 in a manner complementary to that performed at the transmitter system. For example, a Turbo decoder or a Viterbi decoder may be used for decoder 524 if Turbo or convolutional coding, respectively, is performed at the transmitter unit. The decoded data from decoder 524 represents an estimate of the transmitted data. Decoder 524 may provide the status of each received packet (e.g., received correctly or in error). Decoder 524 may further store demodulated data for packets not decoded correctly, so that this data may be combined with data from a subsequent incremental transmission and decoded.

As shown in FIG. 5, a channel estimator 516 may be designed to estimate the channel frequency response, $\hat{H}(k)$, and the noise variance, $\hat{N}_0$, and to provide these estimates to controller 370. The channel response and noise variance may be estimated based on the received data samples for the pilot symbols (e.g., based on the FFT coefficients from FFT 512 for the pilot symbols).

Controller 370 may be designed to implement various aspects and embodiments of the rate selection and the signaling for the incremental transmission. For the rate selection, controller 370 may determine the maximum data rate that may be used for the given channel conditions based on the metric $\Psi$, as described above. For incremental transmission, controller 370 may provide an ACK or a NACK for each received transmission for a given packet, which may be used at the transmitter system to transmit an additional portion of the packet if the packet cannot be recovered correctly at the receiver system.

FIGS. 1A and 3 show a simple design whereby the receiver sends back the rate for the data transmission. Other designs may also be implemented and are within the scope of the invention. For example, the channel estimates may be sent to the transmitter (instead of the rate), which may then determine the rate for the data transmission based on the received channel estimates.

The rate selection and incremental transmission techniques described herein may be implemented using various designs. For example, channel estimator 516 in FIG. 5 used to derive and provide the channel estimates may be implemented by various elements in the receiver system. Some or all of the processing to determine the rate may be performed by controller 370 (e.g., with one or more look-up tables stored in memory 372). Other designs for performing the rate selection and incremental transmission may also be contemplated and are within the scope of the invention.

The rate selection and incremental transmission techniques described herein may be implemented by various means. For example, these techniques may be implemented in hardware, software, or a combination thereof. For a hardware implementation, some of the elements used to implement the rate selection and/or incremental transmission may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, some portions of the rate selection and/or incremental transmission may be implemented with modules (e.g., procedures, functions, and so on) that perform the functions described herein. The software codes may be stored in a memory unit (e.g., memory 332 or 372 in FIG. 3) and executed by a processor (e.g., controller 330 or 370). The memory unit may be implemented within the processor or external to the processor, in which case it can be communicatively coupled to the processor via various means as is known in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method comprising, with at least one wireless communication device of a wireless communication system:
    determining a data rate for a data transmission over a communication channel in the wireless communication system by:
        estimating a signal quality for an equivalent communication channel having a flat frequency response across a system bandwidth based, at least in part, on data transmitted over the communication channel;
        determining a threshold signal quality required for the equivalent communication channel to support a desired level of performance in providing data communication at a particular data rate based, at least in part, on a particular modulation scheme and a particular coding scheme associated with at least one of a plurality of frequency subchannels of the communication channel to be used for the data transmission;
        determining whether or not the particular data rate is supported by the communication channel based, at least in part, on the estimated signal quality for the equivalent communication channel and the threshold signal quality for the equivalent communication channel: and wherein estimating the signal quality further comprises: identifying a set of parameters associated with at least the particular coding scheme and the particular modulation scheme to be used for the data transmission; and estimating one or more characteristics of the communication channel, wherein the one or more estimated characteristics of the communication channel comprise an estimated frequency response of the communication channel and an estimated noise variance of the communication channel.

2. The method of claim 1, wherein the estimating the signal quality further comprises:

determining an equivalent data rate for the equivalent communication channel based, at least in part, on a first function, the set of parameters, and the one or more estimated characteristics of the communication channel, and wherein the estimated signal quality is based, at least in part, on a second function, the equivalent data rate, and the particular modulation scheme.

3. The method of claim 2, wherein the first function comprises a constrained channel capacity function.

4. The method of claim 2, wherein the second function comprises an inverse of the first function.

5. The method of claim 2, wherein the first function comprises a Shannon channel capacity function.

6. The method of claim 1, wherein the threshold signal quality is quantified by a signal-to-noise-end-interference ratio (SNR).

7. The method of claim 6, wherein estimating the signal quality further comprises:

estimating a post-detection SNR for the communication channel based on a particular equalizer, and wherein the estimated signal quality for the equivalent communication channel comprises the estimated post-detection SNR.

8. The method of claim 7, wherein the particular equalizer comprises at least one of a minimum mean square error linear equalizer (MMSE-LE) or a decision feedback equalizer (DFE).

9. The method of claim 1, wherein a single modulation scheme is used for all frequency subchannels used for the data transmission.

10. The method of claim 1, wherein a plurality of modulation schemes are used for the plurality of frequency subchannels used for the data transmission.

11. The method of claim 1, wherein the wireless communication system comprises an orthogonal frequency division multiplex (OFDM) system.

12. The method of claim 1, further comprising, with said at least one Wireless communication device:

selecting the data rate from among a set of available rates, and wherein at least two or more available rates are evaluated to determine a highest data rate supported by the communication channel.

13. A wireless communication device to determine a data rate for a data transmission over a communication channel in a wireless communication system, the wireless communication device comprising:

one or more processors to:

estimate a signal quality for an equivalent communication channel having a flat frequency response across a system bandwidth based, at least in part, on data transmitted over the communication channel;

determine a threshold signal quality required for the equivalent communication channel to support a desired level of performance in providing data communication at a particular data rate based, at least in part, on a particular modulation scheme and a particular coding scheme associated with at least one of a plurality of frequency subchannels of the communication channel to be used for the data transmission;

indicate whether or not the particular data rate is supported by the communication channel based, at least in part, on the estimated signal quality for the equivalent communication channel and the threshold signal quality for the equivalent communication channel; and wherein, to estimate the signal quality, the one or more processors to further: identify a set of parameters associated with at least the particular coding scheme and the particular modulation scheme to be used for the data transmission; and estimate one or more characteristics of the communication channel, wherein the one or more estimated characteristics of the communication channel comprise an estimated frequency response of the communication channel and an estimated noise variance of the communication channel.

14. An article comprising:

a non-transitory computer-readable medium having stored therein one or more computer implementable instructions executable by one or more processors in a wireless communication device to determine a data rate for a data transmission over a communication channel in a wireless communication system, the instructions being executable by the one or more processors to:

estimate a signal quality for an equivalent communication channel having a flat frequency response across a system bandwidth based, at least in part, on data transmitted over the communication channel;

determine a threshold signal quality required for the equivalent communication channel to support a desired level of performance in providing data communication at a particular data rate based, at least in part, on a particular modulation scheme and a particular coding scheme associated with at least one of a plurality of frequency subchannels of the communication channel to be used for the data transmission;

determine whether or not the particular data rate is supported by the communication channel based, at least in part, on the estimated signal quality for the equivalent communication channel and the threshold signal quality for the equivalent communication channel; and wherein, to estimate the signal quality, the instructions are further executable by the one or more processors to: identify a set of parameters associated with at least the particular coding scheme and the particular modulation scheme to be used for the data transmission; and estimate one or more characteristics of the communication channel, wherein the one or more estimated characteristics of the communication channel comprise an estimated frequency response of the communication channel and an estimated noise variance of the communication channel.

15. An apparatus for determining a data rate for a data transmission over a communication channel in a wireless communication system, the apparatus comprising:

means for estimating a signal quality for an equivalent communication channel having a flat frequency response across a system bandwidth based, at least in part, on data transmitted over the communication channel;

means for determining a threshold signal quality required for the equivalent communication channel to support a desired level of performance in providing data communication at a particular data rate based, at least in part, on a particular modulation scheme and a particular coding scheme associated with at least one of a plurality of frequency subchannels of the communication channel to be used for the data transmission;

means for determining whether or not the particular data rate is supported by the communication channel based, at least in part, on the estimated signal quality for the equivalent communication channel and the threshold signal quality for the equivalent communication channel; and wherein estimating the signal quality further comprises: identifying a set of parameters associated with at least the particular coding scheme and the particular modulation scheme to be used for the data transmission; and estimating one or more characteristics of the communication channel, wherein the one or more estimated characteristics of the communication channel comprise an estimated frequency response of the communication channel and an estimated noise variance of the communication channel.

16. The apparatus of claim 15, and further comprising:
means for determining an equivalent data rate for the equivalent communication channel based, at least in part, on a first function, the set of parameters, and the one or more estimated characteristics of the communication channel, and wherein the estimated signal quality is based, at least in part, on a second function, the equivalent data rate, and the particular modulation scheme.

17. The apparatus of claim 15, wherein the threshold signal quality is quantified by a signal-to-noise-end-interference ratio (SNR).

18. The apparatus of claim 17, and further comprising:
means for estimating a post-detection SNR for the communication channel based on a particular equalizer, and wherein the estimated signal quality for the equivalent communication channel comprises the estimated post-detection SNR.

19. The apparatus of claim 15, and further comprising:
means for selecting the data rate from among a set of available rates, and wherein at least two or more available rates are evaluated to determine a highest data rate supported by the communication channel.

20. The apparatus of claim 15, wherein the wireless communication system comprises an orthogonal frequency division multiplex (OFDM) system.

* * * * *